United States Patent [19]

Bernath

[11] Patent Number: 4,700,758
[45] Date of Patent: Oct. 20, 1987

[54] DEVICE FOR TRIMMING THE EDGES OF VENEER

[75] Inventor: Oskar Bernath, Umikon, Switzerland

[73] Assignee: Georg Fischer Aktiengesellschaft, Switzerland

[21] Appl. No.: 862,679

[22] Filed: May 13, 1986

[30] Foreign Application Priority Data

May 14, 1985 [CH] Switzerland .................. 2056/85

[51] Int. Cl.⁴ ................................. B27C 1/00
[52] U.S. Cl. ....................... 144/118; 83/365; 83/368; 144/176; 144/242 E; 144/245 A; 144/357; 219/121 LZ
[58] Field of Search ............ 219/121 LZ, 121 LS, 219/121 LT, 121 LK; 83/360, 365, 368; 144/242 E, 245 A, 356, 357, 118, 176

[56] References Cited

U.S. PATENT DOCUMENTS

| | | | |
|---|---|---|---|
| 3,963,938 | 6/1976 | Sanglert | 144/357 |
| 3,983,403 | 9/1976 | Dahlstrom et al. | 144/357 |
| 4,188,544 | 2/1980 | Chasson | 144/357 |
| 4,240,477 | 12/1980 | Horn et al. | 144/357 |
| 4,383,561 | 5/1983 | Gregoire et al. | 144/357 |

Primary Examiner—W. D. Bray
Attorney, Agent, or Firm—Toren, McGeady & Associates

[57] ABSTRACT

A device for trimming two opposite edges of veneer to provide parallel edges uses optical apparatus to scan the edges and determine the maximum width to which the veneer can be trimmed. The veneer is scanned at an inlet table upstream in the feed direction from a trimming apparatus in which previously checked veneer is cut to the determined width. The width to be cut is stored in a controlled device. When the trimming apparatus completes the cutting of the previously checked veneer, the control device sets the trimming apparatus for the width of the veneer to be cut and the veneer is moved from the inlet table to the trimming apparatus and is cut.

10 Claims, 3 Drawing Figures

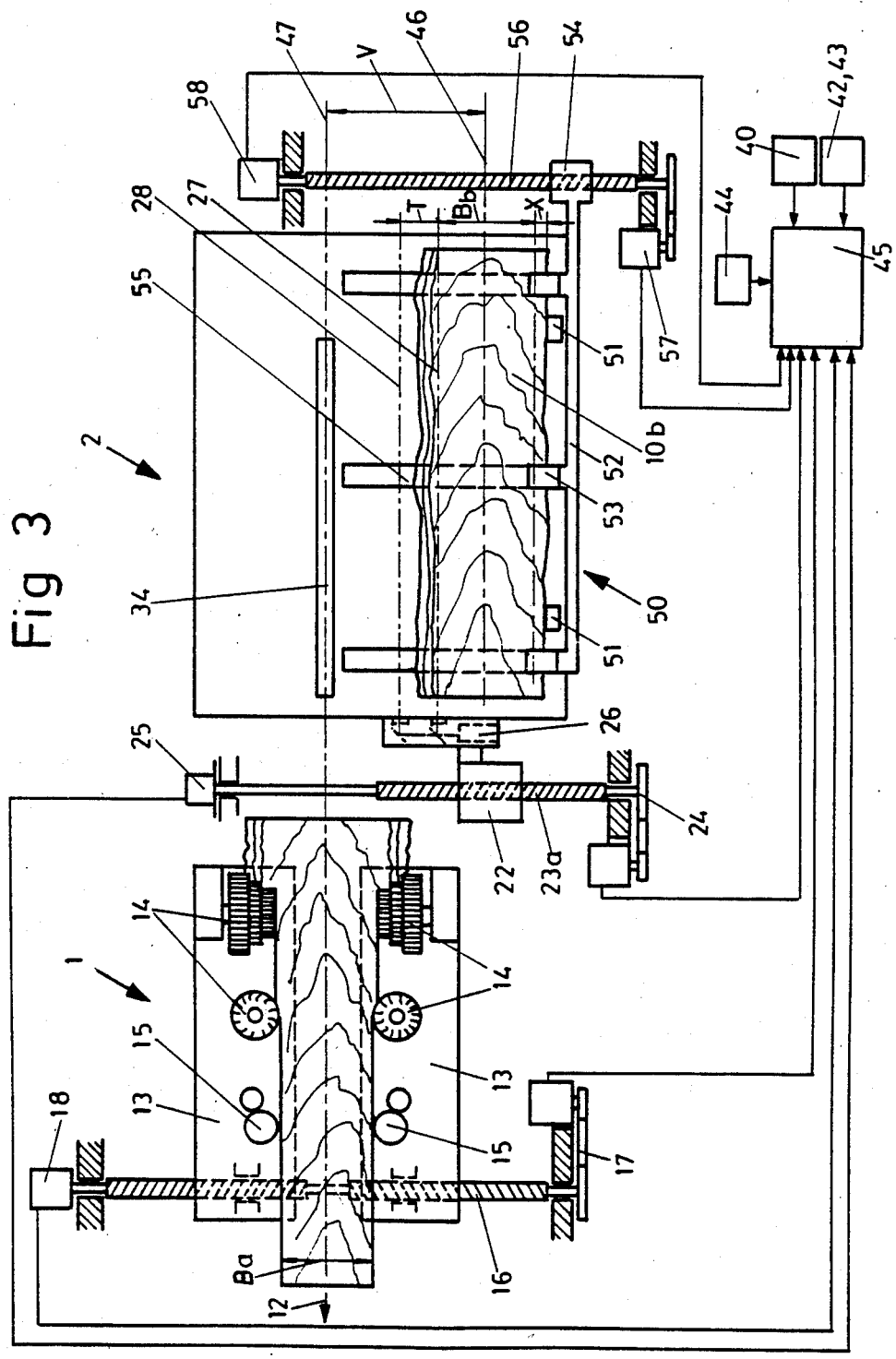

DEVICE FOR TRIMMING THE EDGES OF VENEER

BACKGROUND OF THE INVENTION

The present invention is directed to a device for parallel trimming of the opposite sides of veneer sheets and stacks of veneer sheets. The veneer is passed in a first direction to a trimming apparatus including a tool carriage movably displaceable transversely of the first direction with tools on the carriage for cutting the edges of the veneer. An inlet table is spaced upstream in the first direction from the tool carriage and optical apparatus is arranged to check the edges of the veneer to be cut while it is located on the inlet table.

In U.S. Pat. No. 3,375,987 a veneer trimming machine is disclosed in which a stack of veneer sheets held between a lower conveyor belt or chain and upper pressure rollers is cut along its opposite edges to a selected veneer width by cutting tools in the form of milling cutters arranged on both sides of a displaceable tool carriage. Because of the previously adjustable machining widths, effective utilization of the veneer is not possible with this machine. An improved device of the above-mentioned type (+GF+-Prospectus "Veneer Trimming Machines" FPA Prospectus No. HZ 1015/1, 3.85) includes apparatus with an additional inlet feed table with conveyor belts on to which laser directed lines can be projected. The optics or the optical apparatus for the directed lines are mounted directly on two tool carriages so that the directed lines along with the cutting tools are displaceable transversely to the feed direction of the veneer. With this arrangement, the the largest possible width of the veneer or stack of veneer to be cut can be determined, however, this is possible only after the previously checked veneer has already exited from the cutting apparatus so that idle periods for the apparatus and the operating personnel occur.

SUMMARY OF THE INVENTION

Therefore, it is the primary object of the present invention, based on the state of the art mentioned above, to provide a cutting apparatus as mentioned above where the processing time is considerably reduced while determining the selected width of the veneer and assuring an optimum finished width.

In accordance with the present invention, the optical checking apparatus is movably supported separately from the tool carriage so that the optical checking apparatus can determine the width of the veneer to be cut and a control device can be provided for storing the predetermined width until the veneer is ready to be cut.

In accordance with the present invention, the next veneer or stack of veneer can be located on the inlet or feed table while the previously checked veneer is being trimmed and the veneer on the inlet table can be optically scanned to determine the maximum width dimension of the veneer so that effective utilization of the veneer is achieved due to the optical scanning and the determined width dimension is stored in the control device. After the previously checked veneer has been trimmed, the tools on the tool carriage are adjusted to the stored width dimension and the trimming of the veneer moved from the inlet table can be carried out. Such procedure affords a more rapid work flow whereby the output of the inventive device can be considerably increased as compared to the prior art.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DEESCRIPTION OF THE DRAWING

In the drawing:

FIG. 3 is a schematic plan view, similar to that shown in FIG. 2, and illustrating another embodiment of the device.

DETAILED DESCRIPTION OF THE INVENTION

Figure 1:
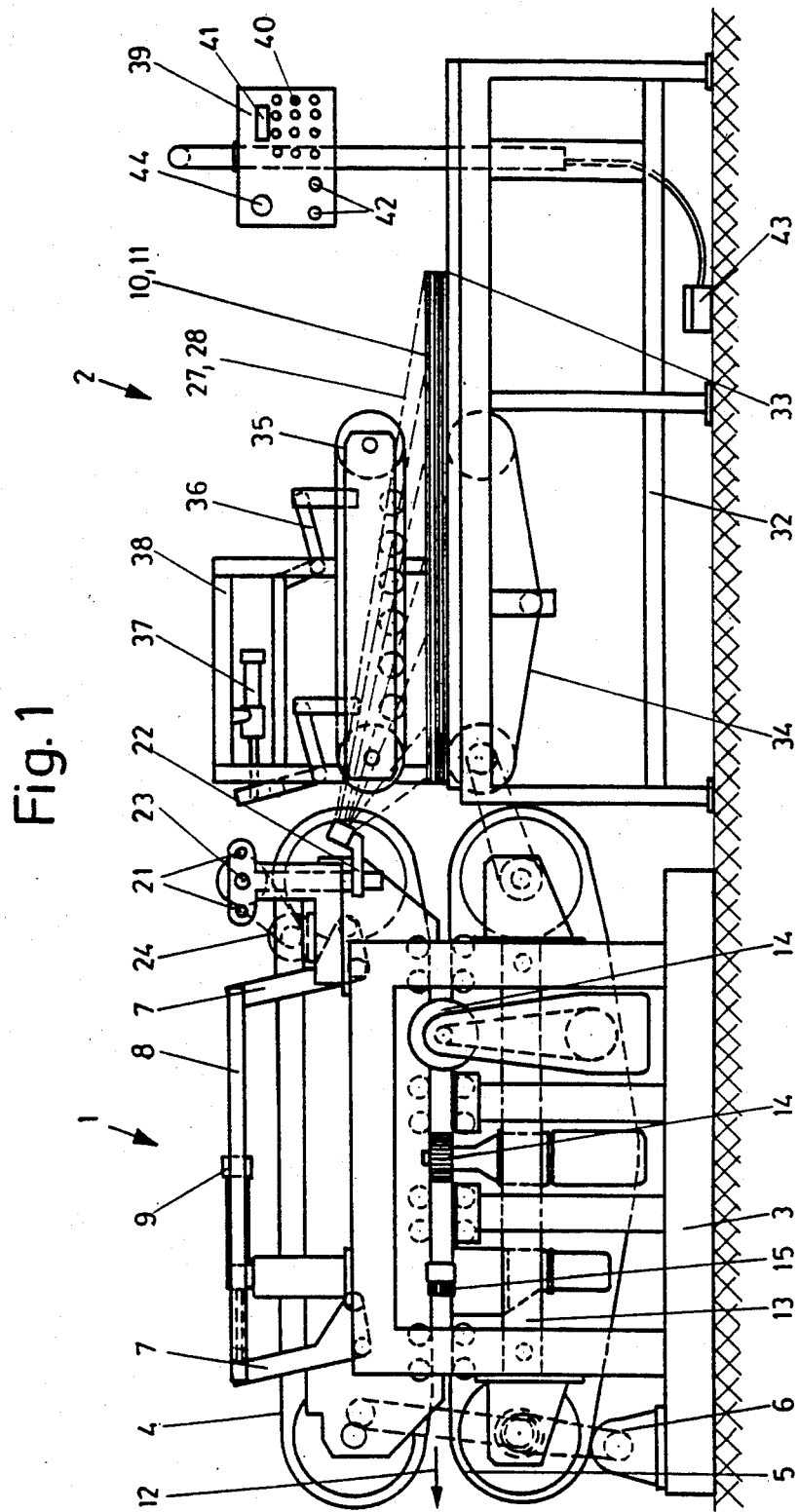
FIG. 1 is a side view of the device embodying the present invention.

The device illustrated in FIG. 1 includes a trimming machine 1 and an inlet or feed table 2.

An upper conveying device 4 and a lower conveying device 5 are located on a stand 3 of the trimming machine and both of the conveying devices can be driven by a drive member 6 mounted on the stand. The conveying devices 4, 5 may be in the form of endless conveyor belts or chains having a width smaller than the minimum width of the veneer to be cut. The conveying devices are arranged centrally with respect to the long axis 47 of the device, note FIG. 2, that is, the axis which represents the direction in which the veneer is fed into and through the trimming machine 1. The upper conveying device 4 is secured on the stand 3 so that it can be lifted and lowered by pivoted levers 7 and linkage 8 and can be pressed against a veneer stack 10 made up of a number of individual veneer sheets 11 to be trimmed. A hydraulic or pneumatic cylinder 9 operates the pivoted lever 7 and the linkage 8.

The trimming machine 1 includes a pair of tool carriers 13 arranged to be moved transversely of the direction 12 in which the veneer is passed from the inlet table 2 into and through the trimming machine. The tool carriages 13 are located along both sides of the lower conveying device 5. Each tool carriage 13 mounts two cutting tools 14, one located downstream of the other in the direction of movement of the veneer through the trimming machine 1. Downstream of the cutting tools 14 is a glue application device 15 on each tool carriage 13. As shown schematically in FIG. 2, the tool carriages 13 can be simultaneously displaced toward or away from one another by a spindle 16 which has a left-handed thread on one half and a right-handed thread on the other. A drive 17 powers the spindle 16. At the opposite end of the spindle 16 from the drive 17, a travel measurement transmitter 18 is positioned and is in the form of a rotational pulse transmitter.

The first cutting tools 14 encountered by the veneer as it moves into the trimming machine 1 are step-shaped milling cutters 19 rotating about an horizontal axis. Downstream are another pair of opposed cutting tools 14 located opposite one another for effecting the finish trimming of the veneer and these cutting tools are milling cutters 20 rotating about a vertical axis. The maximum trimming depth of the cutters 19, 20 is indicated by the reference character T.

Figure 2:
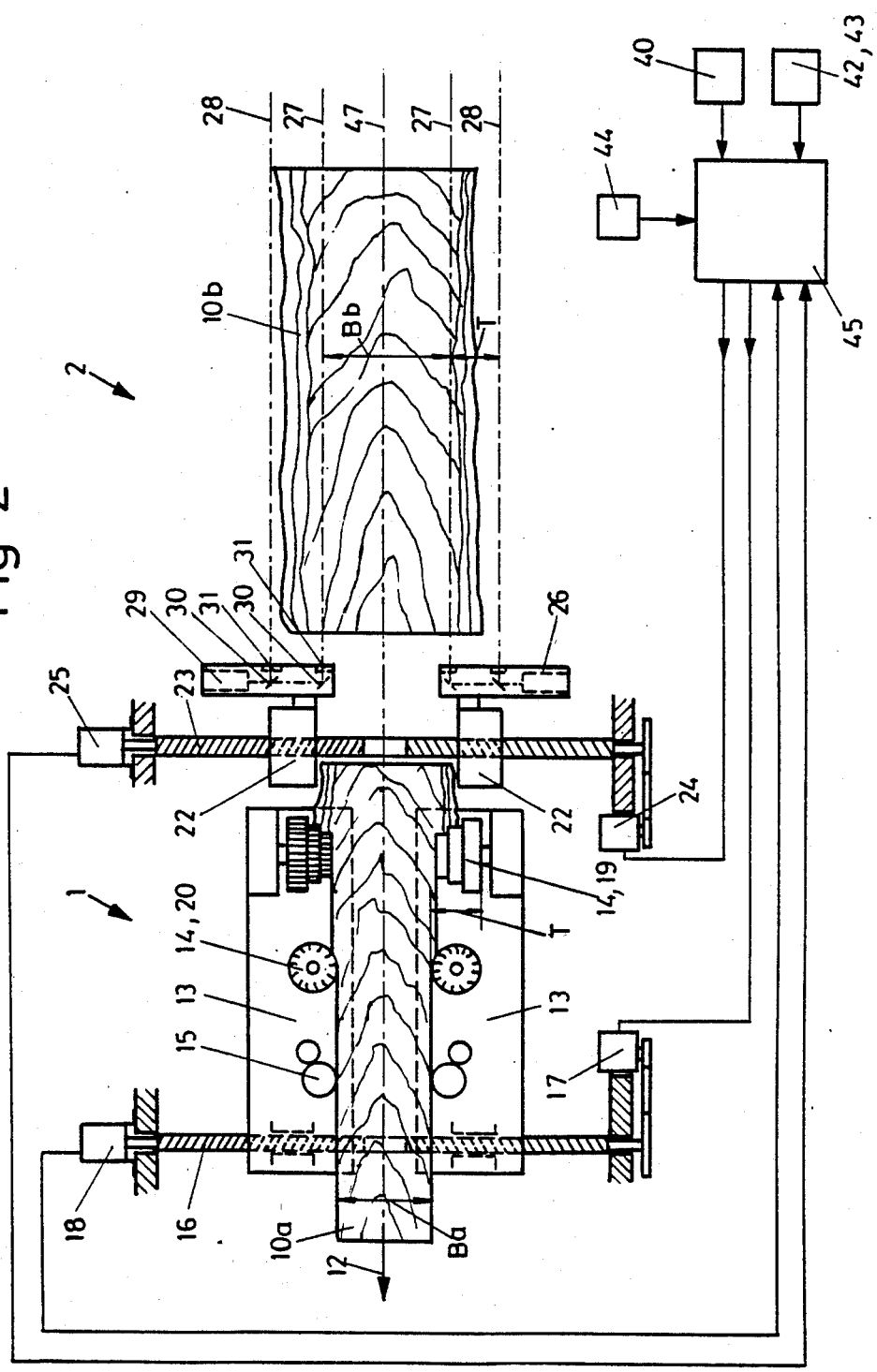
FIG. 2 is a schematic plan view of the device illustrated in FIG. 1.

As displayed in FIGS. 1 and 2, two carriages 22 are located at the inlet side of the trimming machine 1 mounted on guides 21 so that they can be moved transversely of the direction 12 of the veneer passing through the trimming machine. The carriages 22 can be displaced toward or away from one another at the same time by a spindle 23 having a left-hand thread on one part and a right-hand thread on another. Spindle 23 is powered by a drive 24 at one end and a travel measurement transmitter 25, in the form of a rotational pulse transmitter, is located at the opposite end.

Each carriage 22 mounts an optical scanning apparatus 26 for generating parallel lines 27, 28, note FIG. 2 showing these lines extending along the opposite sides of the inlet table 2. Each optical scanning apparatus 26 includes a laser light source 29 for producing fan-shaped laser beams by means of reflecting mirrors 30 and lenses 31 which generate the lines 27, 28 extending along the opposite sides of the inlet table 2. The fan-shaped arrangement of the light beams or lines can be seen in FIG. 1.

As illustrated in FIG. 1, the inlet table 2 includes a stand 32 with a support surface 33 on which the stack 10 of the veneer sheets 11 is located. A lower conveyor belt 34 is located in the support surface 33 and an upper conveyor belt 35 is spaced upwardly from the support surface. Upper conveyor belt 35 is mounted on a pivoted linkage 36 so that it can be lifted and lowered and can be pressed against the veneer stack 10 by a hydraulic or pneumatic cylinder 37. In addition, the upper conveyor belt 35 can be moved from the operator's side of the table toward the rear for positioning and aligning the veneer stack 10 so that the lines or beams 27, 28 can be directed without any interference on to the support surface 33. Accordingly, the entire upper frame 38 can be displaced transversely of the feed direction 12 of the veneer by means not illustrated.

A pivotably supported control console 39 is mounted along the inlet table and in addition to other circuit elements includes pushbuttons 40 for the digital dimensional input for the desired finished dimensions of the veneer, a digital display 41 for the selected dimension, hand-operated switches 42 for displacing the carriages 22 and a switch 44 for triggering the starting signal. The movement of the carriages 22 can also be effected by foot pedal 43 connected to the control console 39.

As shown in FIG. 2, the two drive members 17, 24, as well as the travel measurement transmitters 18, 25 are connected with a control 45 operatively connected to the pushbuttons 40 for the dimensional input and to the hand-operated or foot-operated switches 42, 43 and the actuating switch 44.

In FIG. 2 the Veneer stack $10b$ is positioned on the inlet table 2 and by displacing the carriage 22 transversely of the veneer feed direction, the maximum possible finished dimension $B_b$ is determined. While the scanning operation is being carried out at the inlet table 2, another veneer stack $10a$ can be cut to another finished dimension $B_a$ in the trimming machine 1. The outer beam or line 28 checks whether the portion of the veneer to be cut or removed falls within the depth T of the cutting tools 14 in the trimming machine 1. After determining the width $B_b$ of the veneer, which has been simultaneously determined by the travel measurement transmitter 25, the width is stored in the control 45. After the cutting of the edges of the veneer stack $10a$ is completed in the trimming machine 1, a start order is supplied by the switch 44 and the tool carriages 13 are reset to cut to the selected dimension $B_b$ and the veneer stack $10b$ is transported from the inlet table 2 into the trimming machine 1 by the conveyor belts 34, 35. As the veneer stack $10b$ moves into the trimming machine 1, the transport of the stack is taken over by the conveying devices 4, 5. As the stack $10b$ moves through the trimming machine 1 the opposite side edges of the veneer are cut so that the veneer has the selected width and, if required, glue can be applied by the glue application device 15.

If the veneer stack $10b$ is to be cut to a specific width $B_b$, this dimension is inserted digitally into the control 45 by the push buttons 40 and the beams or lines 27 are then adjusted to this particular dimension. Based upon the lines 27, 28 projected on to the veneer stack $10b$ it is checked by the optical scanning apparatus whether a complete machining of the side edges is possible at the desired dimension.

FIG. 3 displays another embodiment of the inventive device in a schematic plan view and includes a trimming machine 1, an inlet table 2 and a positioning table 50.

The trimming machine 1 includes conveying devices 4, 5 as shown in FIG. 1, two tool carriages 13 each mounting a pair of spaced cutting tools 14 and with a glue application device 15 spaced downstream from the cutting tools 14. In addition, a spindle 16 with a drive 17 and a travel measurement transmitter 18 is provided for effecting the movement of the carriages 13 transversely of the feed direction 12 of the veneer passing through the trimming machine 1.

Inlet table 2 includes the lower conveyor belt 34 and the upper conveyor belt 35 as shown in FIG. 1. On the operator's side of the inlet table 2 there is the support or positioning table 50 with stops 51 and a displaceable veneer stack clamping device 52. The clamping device has clamping members 53 connected with a carriage 54 displaceable transversely to the feed direction 12 with the clamping members 53 located in recesses 55 of the support table 50 and the inlet table 2 and being displaceable for the extent of the recesses 55 in the transverse direction of the inlet table 2. Carriage 54 can be displaced by a spindle 56 with a drive 57 and its displacement travel can be measured by the travel measurement transmitter 58.

Positioned at the downstream end of the table 50 is an optical scanning apparatus 26 for generating the two lines or beams 27, 28. The scanning apparatus is mounted on a carriage 22 which is displaceable in the transverse direction by a spindle $23a$ and a drive 24. The drive 24 is located at one end of the spindle and a travel measurement transmitter 25 is located at the other end.

The travel measurement transmitters 18, 25, 58 and the drives 17, 24, 57 are connected to the control 45. Control 45 is connected with the pushbuttons 40 for a dimensional input, and with the hand-operated switch 42 and the foot-operated switch 43 and with the actuating switch 44.

As shown in FIG. 3, a veneer stack $10b$ is mounted on the support table 50 with the edges of the veneer extending in the feed direction 12 resting against the stops 51 and with the stack being clamped together by the clamping members 53. In this position, the finished edge of the veneer can be determined by the fixed input dimension X. The trimmed width $B_b$ of the veneer pack for the optimum material utilization is determined by the displacement of the line 27. With the location of the line 27 established, the position of the center line 46 of the trimmed veneer stack $10b$ and the displacement travel V of the line 46 to alignment with the axis 47 of the trimming machine is determined in a computer in the control 45 and the dimension for the trimmed width $B_b$ stored in the control. After a starting signal is given, the clamping device 52 with the veneer stack 10b is displaced by the distance V and the upper conveyor belt is lowered on to the top of the veneer stack 10b resting on the inlet table. The clamping members 53 are loosened and moved back into their original position. When the veneer stack 10a has been trimmed and exited from the trimming machine, the two tool carriages 13 are automatically adjusted to cut the veneer stack 10b to the stored dimension $B_b$. Conveyor belts 34, 35 are driven and the veneer stack 10b is moved by the conveyor belts 34, 35 into the trimming machine 1. It is also possible to put a desired width dimension into the control by means of the pushbuttons 40 and such dimension can be checked by the lines 27, 28 as described above with regard to FIG. 2.

It is also possible in the second embodiment shown in FIG. 3 including the support table 50, to utilize two optical scanning devices 26 as shown in FIG. 2 which can be displaced toward or away from one another at the same time so that the veneer stack 10b is aligned with the central axis 46 of the support table. The determination of the finished width $B_b$ is established in the same manner as in FIG. 2.

Subsequently, the clamping elements 53 of the clamping device 52 are moved to the edge of the veneer stack 10b and the stack is clamped. The displacement travel dimension V in this embodiment is always constant.

In the embodiment illustrated in FIG. 3 the positioning and alignment is considerably simplified so that the overall time involved can be further reduced. Furthermore, in this embodiment only one displaceable optical scanning apparatus or device is required.

While specific embodiments of the invention have been shown and described in detail to illustrate the application of the inventive principles, it will be understood that the invention may be embodied otherwise without departing from such principles.

I claim:

1. Device for the parallel trimming of the opposite sides of veneer sheets or stacks of veneer sheets comprising means for passing the veneer in a first direction, a pair of tool carriages disposed opposite one another and movably displaceable transversely of the first direction toward and away from one another, tools for cutting the edges of the veneer mounted on said tool carriage and movable therewith, an inlet table spaced upstream in the first direction from said tool carriages, means for optically checking the edges of the veneer extending in the first direction and located on said inlet table and determining the width or dimension transversely of the first direction to which the veneer is to be cut, wherein the improvement comprises means for movably supporting said optical checking means separately from said tool carriages so that said optical checking means can be moved transversely of the first direction, and control means connected to said optical checking means and to said tool carriages so that the width of the veneer to be cut as determined by said optical checking means can be used for movably displacing said tool carriages and tools into position for cutting the determined width of the veneer.

2. Device, as set forth in claim 1, whereby veneer can be cut by the tools on said tool carriage while said optical checking means determines the width of the veneer to be cut which is located on the inlet table, further comprising means for moving said tool carriages including a spindle, a drive member for said spindle, and a travel measurement transmitter for determining the travel distance effected by said tool carriages so that after the veneer being cut is moved in the first direction out of the path of the tool carriages, said tools and tool carriages can be positioned for cutting the veneer previously checked by said optical checking means on said inlet table.

3. Device, as set forth in claim 1 or 2, herein said optical checking means comprises a laser beam source, reflector mirrors and lenses combined with said laser beam source for forming a pair of parallel fan-shaped laser beams forming parallel beam lines extending parallel to the first direction and the spacing between said lines corresponding to the maximum removal dimension of said tools on said tool carriage.

4. Device, as set forth in claim 3, including a pair of second carriages spaced apart in the direction extending transversely of the first direction, means for mounting said second carriages for movement in the direction extending transversely of the first direction and said means including a drive member and a travel measurement transmitter, and each said second carriage mounting one of said optical checking means for providing the two parallel fan-shaped laser beams.

5. Device, as set forth in claim 4, wherein said second carriages are arranged on the upstream side of said tool carriages, said tool carriages being located on the opposite sides of a center line extending in the first direction, said second carriages being symmetrical about said center line.

6. Device, as set forth in claim 5, wherein a support table is located alongside said inlet table and upstream from said tool carriages, a clamping device for clamping a stack of veneer sheets located on said support table, said support table and clamping device being displaceable transversely of the first direction, and at least one second carriage 22 mounting said optical checking means located at the downstream end of said support table relative to the movement of the veneer from the inlet table to the tool carriages.

7. Device, as set forth in claim 6, wherein said support table comprises stops spaced apart thereon in the first direction and arranged to contact one side of the veneer extending in the first direction whereby said stops determine one edge of the veneer to be cut and said optical checking means displaceable on said second carriage determine the width of the opposite edges of the veneer extending in the first direction so that a center line of the veneer extending in the first direction can be determined for alignment with the center line of the tool carriages and the required transverse travel of the clamping device for moving the center line of veneer on the support table into alignment with the center line of the tool carriages and such movement being computed in said control means.

8. Device, as set forth in claim 7, including drive means for displacing said clamping device transversely of the first direction and said drive means including a drive member and a travel measurement transmitter.

9. Device, as set forth in claim 8, wherein said control means are arranged for selecting the center line of the veneer mounted on said support table for alignment with the center line of said tool carriages.

10. Device, as set forth in claim 1 or 2, wherein said control means includes at least one of a foot and hand-operated switch for positioning said optical checking means for selecting the width of the veneer to be cut for optimum material utilization.

* * * * *